US012763866B2

(12) United States Patent
Huovinen et al.

(10) Patent No.: US 12,763,866 B2
(45) Date of Patent: Oct. 13, 2026

(54) SYSTEM AND METHOD TO CHANGE PA AND PAWR TIMING

(71) Applicant: Silicon Laboratories Inc., Austin, TX (US)

(72) Inventors: Lasse Huovinen, Espoo (FI); Toni Juhani Kettula, Espoo (FI); Lauri Hintsala, Vihti (FI); Jussi Mäkinen, Espoo (FI)

(73) Assignee: Silicon Laboratories Inc., Austin, TX (US)

( * ) Notice: Subject to any disclaimer, the term of this patent is extended or adjusted under 35 U.S.C. 154(b) by 281 days.

(21) Appl. No.: 18/581,975

(22) Filed: Feb. 20, 2024

(65) Prior Publication Data

US 2025/0266921 A1 Aug. 21, 2025

(51) Int. Cl.

| | |
|---|---|
| ***H04H 60/40*** | (2008.01) |
| ***H04H 60/37*** | (2008.01) |
| ***H04H 60/92*** | (2008.01) |

(52) U.S. Cl.

CPC .......... *H04H 60/40* (2013.01); *H04H 60/375* (2013.01); *H04H 60/92* (2013.01)

(58) Field of Classification Search

CPC ...... H04H 60/40; H04H 60/375; H04H 60/92; H04H 60/31; H04H 60/43; H04W 52/0229; H04W 52/0216; H04W 72/1215; H04W 52/36; H04W 56/001; H04W 72/566; H04W 72/569; H04W 4/80; H04W 76/15; H04W 4/50; H04B 7/06

See application file for complete search history.

(56) References Cited

U.S. PATENT DOCUMENTS

| | | | | |
|---|---|---|---|---|
| 2024/0276304 | A1* | 8/2024 | Rangineni | H04W 28/18 |
| 2024/0357646 | A1* | 10/2024 | Mallat | H04W 4/80 |
| 2025/0150948 | A1* | 5/2025 | Lnu | H04W 72/1268 |
| 2026/0107148 | A1* | 4/2026 | Narula | H04W 12/50 |
| 2026/0181603 | A1* | 6/2026 | Xu | H04W 72/0446 |

* cited by examiner

*Primary Examiner* — Lana N Le

(74) *Attorney, Agent, or Firm* — Nields, Lemack & Frame, LLC

(57) ABSTRACT

A system and method for efficiently modifying the parameters of a Periodic Advertisement (PA) or Periodic Advertisement with Response (PAwR) train are disclosed. Rather than forcing all of the listening devices to reacquire synchronization to the new PAwR train, the periodic advertiser transmits the parameters associated with the new or revised train in the periodic advertisements of the existing train. The listening devices receive the new parameters and update their timers accordingly such that they exit low power mode in time to receive the periodic advertisement on the new or revised train. In some embodiments, the periodic advertiser generates a new train, while in other embodiments, the periodic advertiser changes the parameters associated with the PA or PAwR train without creating a new train.

18 Claims, 7 Drawing Sheets

SYSTEM AND METHOD TO CHANGE PA AND PAWR TIMING

FIELD

This disclosure describes a system and method to modify previously established PA (Periodic Advertisement) or PAwR (Periodic Advertisement with Response) timing for a peripheral device.

BACKGROUND

The Bluetooth protocol is one of many wireless network protocols that are currently in use. The Bluetooth protocol is commonly used to connect smartphones to watches, headphones, speakers, and other accessories. Bluetooth Low Energy utilizes 40 physical channels in the 2.4 GHZ ISM band, each channel separated by 2 MHZ.

The Bluetooth specification describes a feature referred to as Periodic Advertisements (PA) and Periodic Advertisements with Responses (PAwR). Periodic Advertisements allow a first device, referred to as the periodic advertiser, to broadcast to a plurality of listening devices. Importantly, this mode of communication is connection-less, indicating that a connection does not need to be established between the periodic advertiser and each of the listening devices prior to the transmission of the periodic advertisement.

Periodic Advertisements with Responses extends this feature by allocating specific slots for each of the listening devices to respond to the periodic advertiser.

The transmission of this periodic advertisement occurs at regular intervals, referred to as the periodic advertising interval. These regular intervals may be multiples of 1.25 milliseconds, between 7.5 milliseconds and 81.91875 seconds. In this way, other network devices are able to enter a low power state and can wake up at predetermined times in order to receive the next periodic advertisement. Each listening device is also allocated a specific time window, or response slot during which it may transmit responses to the periodic advertiser.

The process to configure each device for a specific response slot within a PAWR train may be time consuming. For example, each listening device must remain in the powered mode, listening for an extended periodic advertisement. Within that advertisement, the periodic advertiser may inform each listening device of the length of the periodic advertising interval, the number of subevents, the number of responses per subevent, and other parameters. It must then inform each listening device in the network of its specific response slot relative to that PAWR train. If this is only performed once, the overhead may be acceptable. However, there may be instances where it is desirable for the periodic advertiser to change these parameters. For example, the periodic advertiser may choose to change the periodic advertising interval based on time of day or day of the week.

Repeating the configuration process to make this change is time consuming and energy inefficient. Therefore, it would be beneficial if there was a system and method to make these changes without repeating the entire configuration process.

SUMMARY

A system and method for efficiently modifying the parameters of a Periodic Advertisement (PA) or Periodic Advertisement with Response (PAwR) train are disclosed. Rather than forcing all of the listening devices to reacquire synchronization to the new train, the periodic advertiser transmits the parameters associated with the new or revised train in the periodic advertisements of the existing train. The listening devices receive the new parameters and update their timers accordingly such that they exit low power mode in time to receive the periodic advertisement on the new or revised train. In some embodiments, the periodic advertiser generates a new train, while in other embodiments, the periodic advertiser changes the parameters associated with the PA or PAwR train without creating a new train.

According to one embodiment, a method of modifying parameters associated with an initial Periodic Advertisement with Responses (PAWR) train is disclosed. The method comprises transmitting parameters associated with a modified PAWR train from a periodic advertiser to a plurality of wireless devices within an AUX_SYNC_SUBEVENT_IND PDU, wherein the plurality of wireless devices are synchronized to the initial PAwR train; and wherein one of the parameters comprises a timer offset value, which defines a time from a current time to a start of a periodic advertisement on the modified PAwR train. In some embodiments, the plurality of wireless devices receive the AUX_SYNC_SUBEVENT_IND PDU, adjust internal timers based on the timer offset value so as to exit low power mode in time to receive the periodic advertisement on the modified PAWR train. In some embodiments, the parameters include at least one of: a periodic advertising interval; a subevent advertising interval; a number of subevents; a duration of a subevent; or a duration of a response slot. In some embodiments, the periodic advertiser starts the modified PAWR train, such that the periodic advertisement is transmitting both the modified train and the initial PAWR train, before transmitting the parameters. In certain embodiments, the periodic advertiser terminates the initial PAR train after transmitting the parameters. In certain embodiments, the periodic advertiser transmits the parameters during a plurality of AUX_SYNC-_SUBEVENT_IND PDUs before terminating the initial PAWR train. In certain embodiments, the timer offset value represents a time from the current time to a next periodic advertisement on the modified PAWR train. In some embodiments, the periodic advertiser starts the modified PAWR train at a specific time, and the timer offset value is a time from the current time to the specific time. In certain embodiments, the periodic advertiser transmits the parameters during a plurality of AUX_SYNC_SUBEVENT_IND PDUs before starting the modified PAWR train.

According to another embodiment, a Bluetooth network is disclosed. The Bluetooth network comprises a periodic advertiser; and a plurality of wireless devices; wherein the plurality of wireless devices are synchronized to the initial PAwR train transmitted by the periodic advertiser; the periodic advertiser transmits parameters associated with a modified PAwR train from the periodic advertiser to the plurality of wireless devices within an AUX_SYNC_SUBEVENT_IND PDU; and one of the parameters comprises a timer offset value, which defines a time from a current time to a start of a periodic advertisement on the modified PAwR train; and the plurality wireless of devices receive the AUX_SYNC_SUBEVENT_IND PDU, adjust internal timers based on the timer offset value so as to exit low power mode in time to receive the periodic advertisement on the modified PAwR train. In some embodiments, the periodic advertiser starts the modified PAwR train, such that the periodic advertisement is transmitting both the modified PAwR train and the initial PAwR train, before transmitting the parameters. In certain embodiments, the periodic advertiser terminates the initial PAwR train after transmitting the parameters. In some embodiments, the periodic advertiser transmits the parameters during a plurality of AUX_SYNC_SUBEVENT_IND PDUs before terminating the initial PAwR train. In some embodiments, the timer offset value represents a time from the current time to a next periodic advertisement on the modified PAwR train. In some embodiments, the periodic advertiser starts the modified PAwR train at a specific time, and the timer offset value is a time from the current time to the specific time. In certain embodiments, the periodic advertiser transmits the parameters during a plurality of AUX_SYNC_SUBEVENT_IND PDUs before starting the modified PAwR train.

According to another embodiment, a method of modifying parameters associated with an initial Periodic Advertisement (PA) train is disclosed. The method comprises transmitting parameters associated with a modified PA train from a periodic advertiser to a plurality of wireless devices within an AUX_SYNC_IND or an AUX_SYNC_SUBFRAME_IND PDU, wherein the plurality of wireless devices are synchronized to the initial PA train; and wherein one of the parameters comprises a timer offset value, which defines a time from a current time to a start of a periodic advertisement on the modified PA train. In some embodiments, the plurality of wireless devices receive the AUX_SYNC_IND or AUX_SYNC_SUBFRAME_IND PDU, adjust internal timers based on the timer offset value so as to exit low power mode in time to receive the periodic advertisement on the modified PA train. In some embodiments, the periodic advertiser starts the modified PA train, such that the periodic advertisement is transmitting both the modified PA train and the initial PA train, before transmitting the parameters. In some embodiments, the periodic advertiser starts the modified PA train at a specific time, and the timer offset value is a time from the current time to the specific time.

BRIEF DESCRIPTION OF THE DRAWINGS

For a better understanding of the present disclosure, reference is made to the accompanying drawings, in which like elements are referenced with like numerals, and in which.

DETAILED DESCRIPTION

This disclosure makes use of Periodic Advertisements with Responses (PAwR).

Figure 1A:
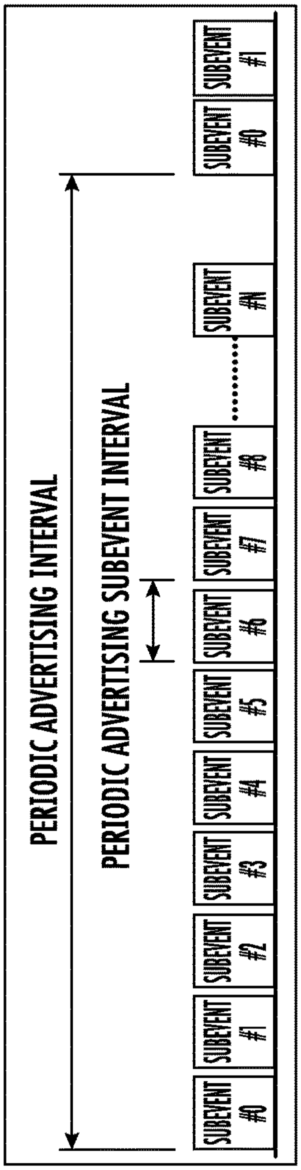
FIG. 1A (PRIOR ART)
FIG. 1A shows a timing diagram showing a periodic advertising interval.
Figure 1B:
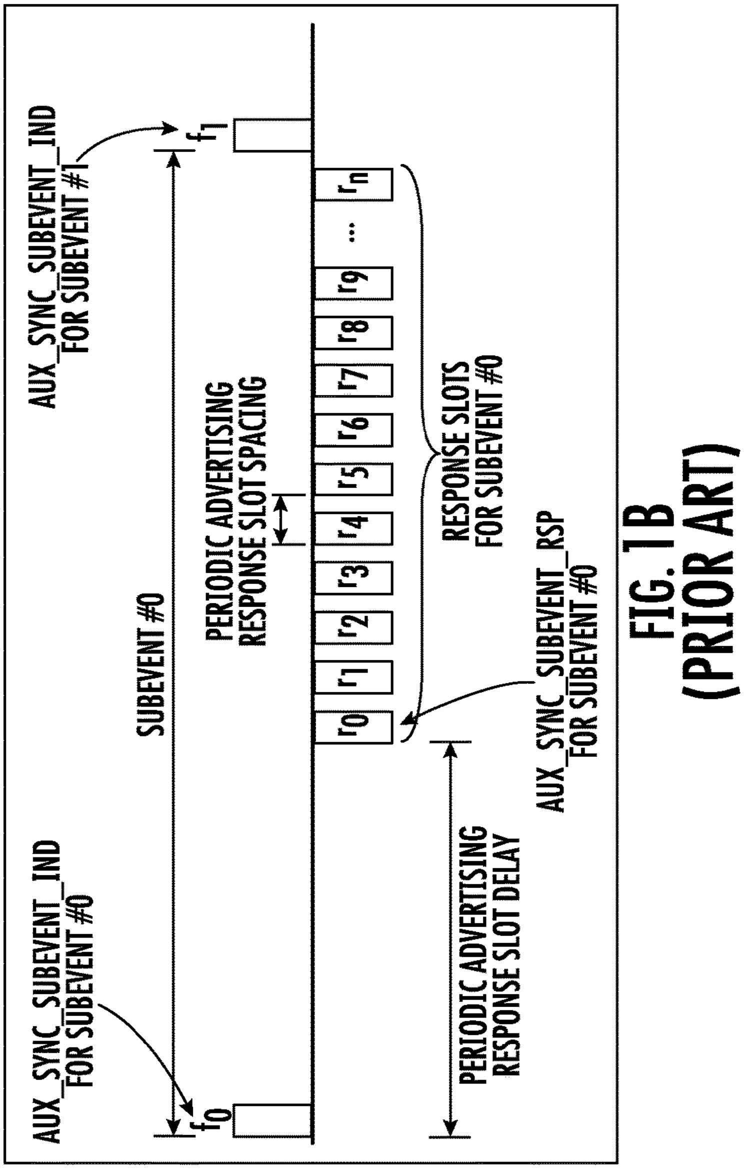
FIG. 1B (PRIOR ART)
FIG. 1B shows an expanded view of one subevent during the periodic advertising interval.

As presented in the Bluetooth specification and shown in FIG. 1A, a PAwR event is repeated at every defined periodic advertising interval, and is divided into subevents. As defined in the Bluetooth specification and shown in FIG. 1B, each subevent includes an AUX_SYNC_SUBEVENT_IND protocol data unit (PDU), sent by the periodic advertiser, and one or more AUX_SYNC_SUBEVENT_RSP PDUs that are sent in response by the listening devices scanning for the periodic advertiser's transmissions.

Importantly, each listening device is allocated a separate timeslot in which to transmit its response PDU. This allows the listening devices to avoid collisions, making transmission of the responses more efficient than would be the case without a collision avoidance scheme.

The response timeslots are allocated to the listening devices by a higher layer protocol. Likewise, the subevent during which the listening device will respond is allocated by a higher layer protocol. This allows for a flexible arrangement of tradeoff between latency of communication and the number of listening devices taking part in the communication. Finally, the time between the AUX_SYNC_SUBEVENT_IND PDU and the start of the response slots is also defined by a higher level protocol.

In operation, the periodic advertiser establishes one or more PAwR trains. Each train is defined by the periodic advertising interval, the number of subevents, the number of response slots per subevent, the duration of each response slot, and other parameters that define the advertising sequence. These parameters allow the listening devices to determine when the periodic advertisements will be transmitted, and when to respond.

As noted above, once created, there is no standardized method to modify one or more parameters of a PAwR train. There are several possible methods to make these modifications. One option is to have the periodic advertiser create a connection with the listening device and transmit the new train parameters over this connection. This, however, is a power intensive procedure, especially when repeated for a large number of listening devices. An alternative is to require all of the listening devices to lose synchronization with the periodic advertiser, listen continuously for an extended advertisement, obtain the parameters that define the new PAwR train and then re-establish synchronization.

This disclosure presents time and power efficient techniques to modify the PAwR train without requiring the listening devices to lose synchronization.

Figure 2A:
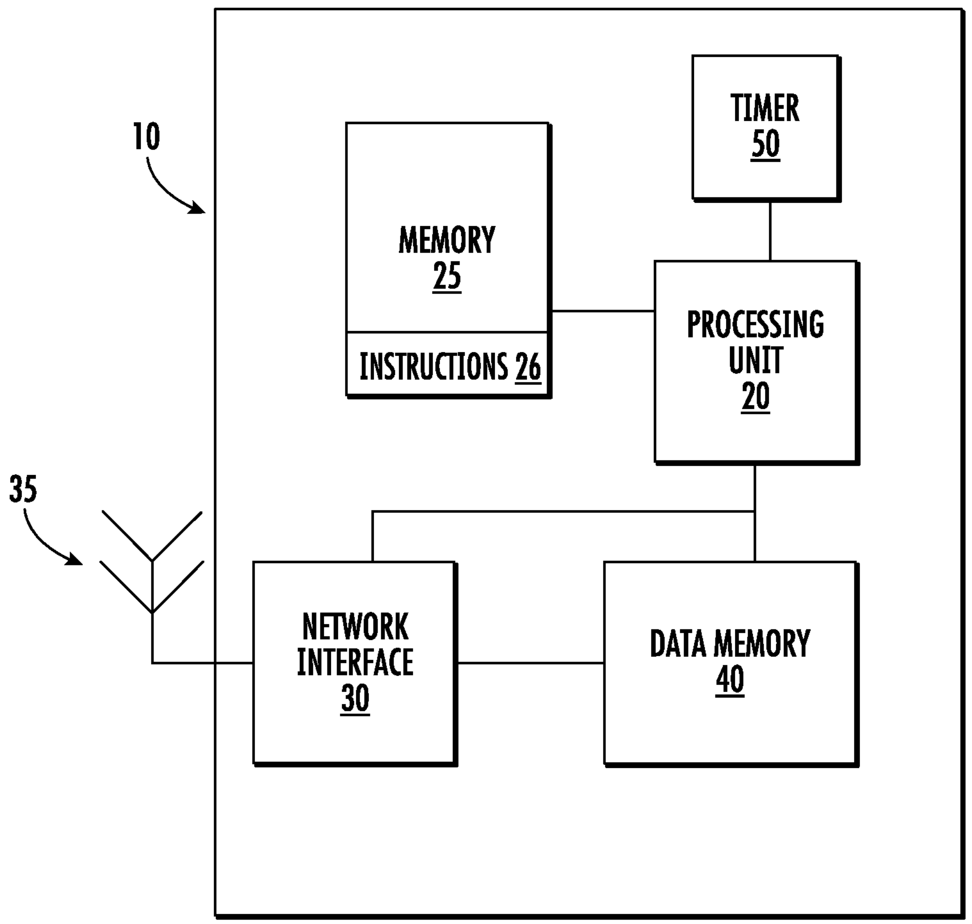
FIG. 2A shows a block diagram of a Bluetooth device according to one embodiment.

FIG. 2A shows a block diagram of a representative Bluetooth device 10 that may be used to implement the disclosed method of changing the PAwR train parameters.

The Bluetooth device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the Bluetooth device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2A. The second computer readable non-transitory media may be a CDROM, or a different memory device, which is located remote from the Bluetooth device 10. The instructions contained on this second computer readable non-transitory media may be downloaded onto the memory device 25 to allow execution of the instructions by the Bluetooth device 10.

The Bluetooth device 10 also includes a Bluetooth network interface 30 that connects with a Bluetooth network 100 using an antenna 35.

The Bluetooth device 10 may include a data memory device 40 in which data that is received and transmitted by the Bluetooth network interface 30 is stored. This data memory device 40 is traditionally a volatile memory. The processing unit 20 has the ability to read and write the data memory device 40 so as to communicate with the other devices in the Bluetooth network 100.

Although not shown, the Bluetooth device 10 also has a power supply, which may be a battery or a connection to a permanent power source, such as a wall outlet.

The Bluetooth device 10 may also have a programmable timer 50. In some embodiments, this timer may be used to bring the device out of sleep mode. In this disclosure, the terms "sleep mode" and "low power mode" are used interchangeably. Specifically, the processing unit 20 may program a value into the timer 50 and then enter sleep mode. The expiration of the timer 50 may cause the processing unit (and the rest of the device) to exit sleep mode.

While the processing unit 20, the memory device 25, the Bluetooth network interface 30, the timer 50 and the data memory device 40 are shown in FIG. 2A as separate components, it is understood that some or all of these components may be integrated into a single electronic component. Rather, FIG. 2A is used to illustrate the functionality of the Bluetooth device 10, not its physical configuration.

Figure 2B:
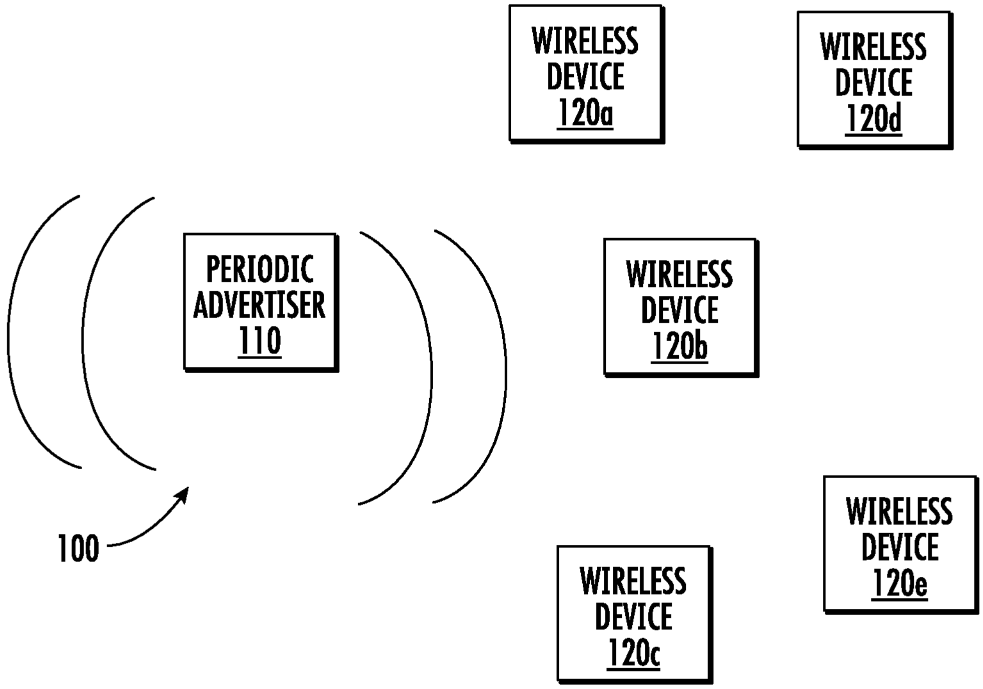
FIG. 2B shows a Bluetooth network including a periodic advertiser, and multiple wireless devices.

FIG. 2B shows a Bluetooth network 100 that includes a plurality of wireless devices 120*a*-120*e*, all of which may have an architecture similar to that shown in FIG. 2A. This may be referred to as a wireless network. The periodic advertiser 110 may also have a similar architecture. However, the processing power, memory capability and power requirements of the periodic advertiser 110 may be greater than that of the wireless devices 120*a*-120*e*.

In this figure, the periodic advertiser 110 may transmit a periodic advertisement to the wireless devices in the Bluetooth network 100. This periodic advertisement is received by the wireless devices 120*a*-120*e* shown in FIG. 2B. The wireless devices 120*a*-120*e* may each provide a response to this periodic advertisement in accordance with the protocol illustrated in FIGS. 1A-1B. Thus, in this disclosure, the wireless devices represent listening devices.

Figure 3:
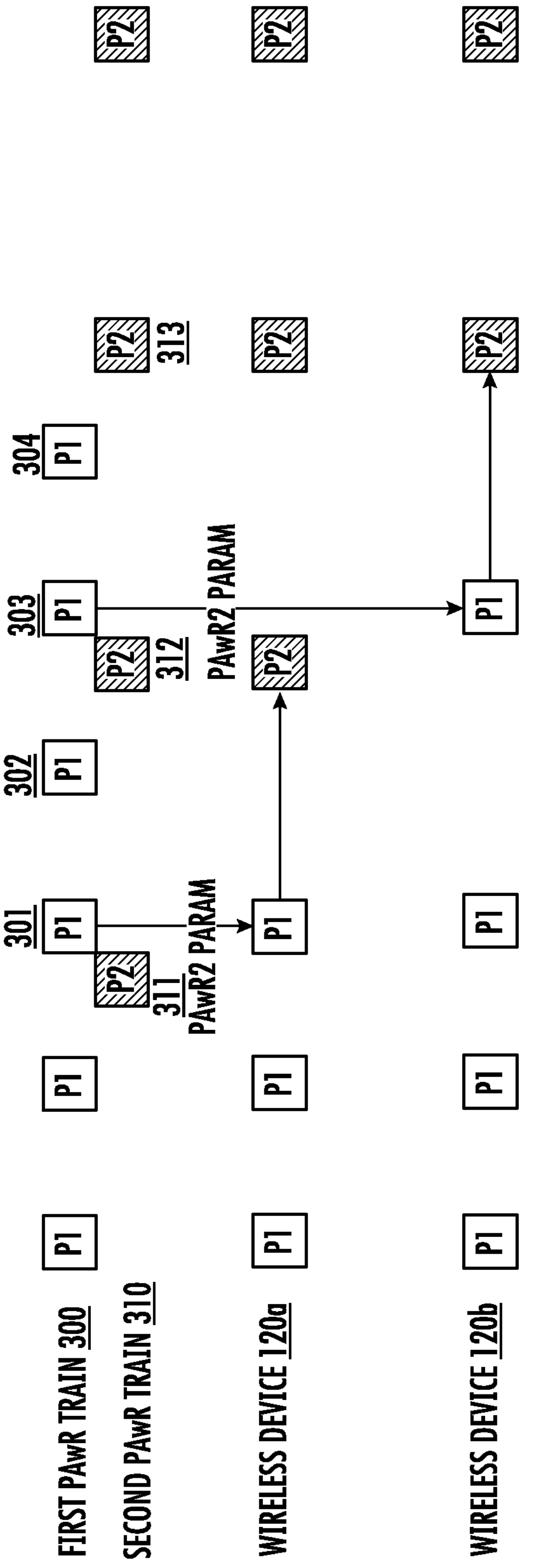
FIG. 3 shows a timing diagram showing the transition from one PAwR train to a second PAwR train according to one embodiment.
Figure 4:
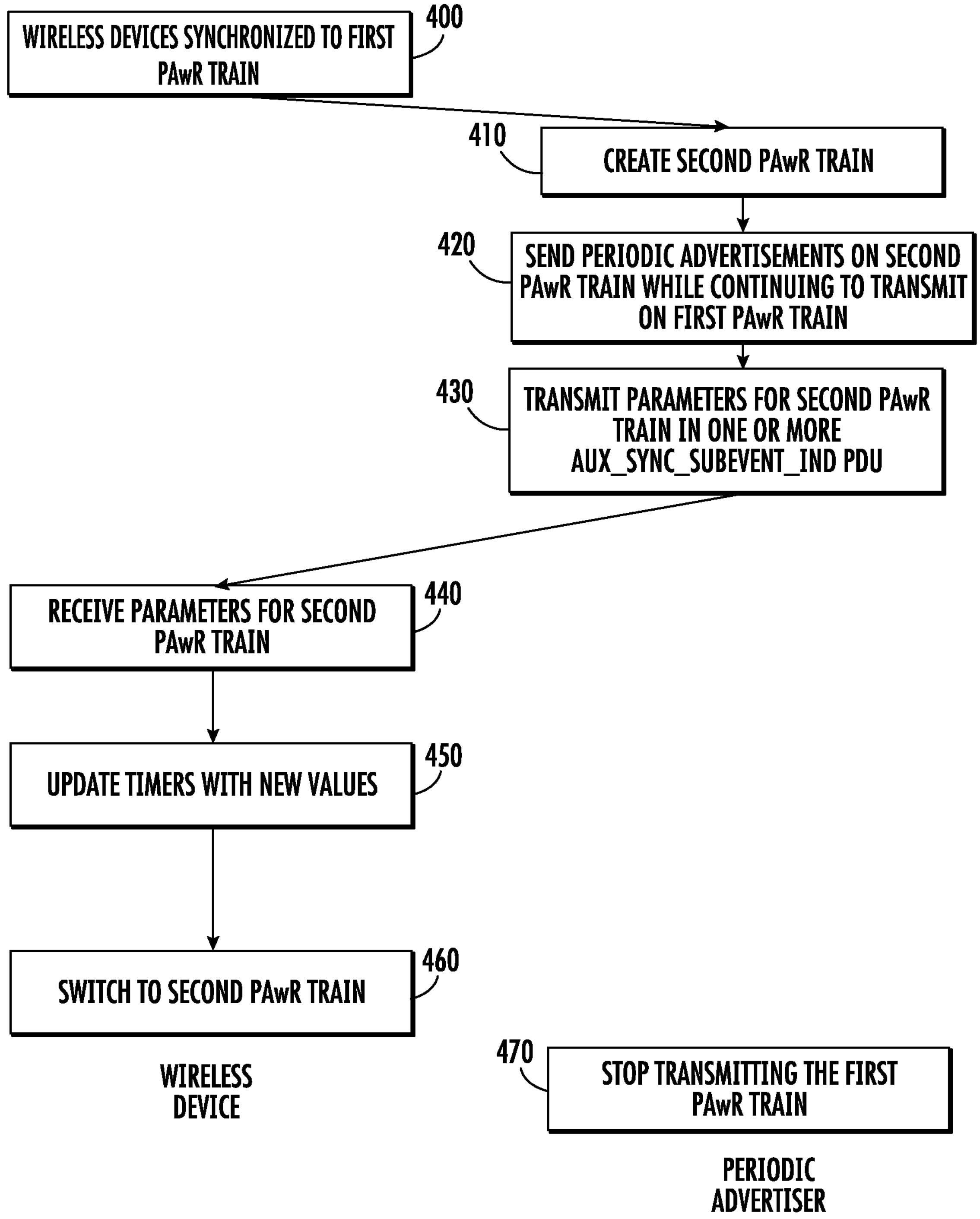
FIG. 4 is a flowchart showing the operation of the advertiser and wireless devices using the method of FIG. 3.

FIG. 3 shows a timing diagram which illustrates how the wireless devices 120*a*-120*b* can switch from a first PAwR train to a second PAwR train. FIG. 4 shows a flowchart detailing the operation of the periodic advertiser 110 and the wireless devices 120*a*-120*e* during this process.

At the start of this process, as shown in Box 400, all of the wireless devices 120*a*-120*e* are synchronized to the first PAWR train 300. At some point, as shown in Box 410, the periodic advertiser 110 starts the second PAR train 310. This means that the periodic advertiser 110 is still transmitting periodic advertisements, in the form of AUX_SYNC_SUBEVENT_IND PDUs, on the first PAwR train 300, but has also begin transmitting periodic advertisements on the second PAwR train 310, as shown in Box 420. Next, the periodic advertiser 110 transmits the parameters associated with the second PAwR train 310 during the periodic advertisements on the first PAwR train 300, as shown in Box 430. These parameters may include at least some of the following:

- the new periodic advertising interval,
- the subevent advertising interval,
- the number of subevents,
- the number of response slots in each subevent,
- the duration of each subevent,
- the duration of each response slot,
- the delay from the start of a subevent to the first response slot, or
- others.

These parameters may be transmitted as a part of the AUX_SYNC_SUBEVENT_IND header. Specifically, the header contains an ACAD (Additional Controller Advertising Data) field, which may also contain vendor specific data, if desired. These parameters may be included in the ACAD field. Additionally, the AUX_SYNC_SUBEVENT_IND PDU also includes a timer offset value, which represents the duration of time from the current periodic advertisement to the start of a periodic advertisement on the second PAwR train 310. This may be the time to the next periodic advertisement on the second PAwR train 310, or may be a periodic advertisement that is further in the future. In the example shown in FIG. 3, the timer offset value is set to the time from the current periodic advertisement on the first PAwR train 300 to the next periodic advertisement on the second PAwR train 310. Note that the periodic advertiser 110 begins transmitting this information during periodic advertisement 301, and repeats it (although the timer offset value may be changed to reflect the time to the next periodic advertisement on the second PAwR train 310) in periodic advertisements 302, 303 and 304. The information is repeated to ensure that all of the wireless devices 120*a*-120*e* received the new parameters. By repeating the information, the procedure allows for reception errors.

Next, as shown in Box 440, the wireless device receives the periodic advertisement which contains the parameters of the second PAwR train 310. Next, the wireless device updates its timer 50 with the new parameters, as shown in Box 450. The timer 50 may first be loaded with the timer offset value, which allows the wireless device to exit sleep mode in time to receive the periodic advertisement on the second PAwR train 310. Note that in FIG. 3, the wireless device 120*a* receives the periodic advertisement 301 from the first PAwR train 300, uploads its timer with the timer offset value, and is able to receive the periodic advertisement 312 on the second PAwR train 310. After this, the wireless device 120*a* is synchronized to the second PAWR train 310 and will use the new periodic advertising interval to determine when it should next exit sleep mode to receive an AUX_SYNC_SUBEVENT_IND PDU, as shown in Box 460.

Note that in FIG. 3, wireless device 120*b* did not receive the periodic advertisement 301. Thus, the wireless device 120*b* remains synchronized to the first PAwR train 300. Later, the wireless device 120*b* is able to receive periodic advertisement 303. The wireless device 120*b* then processes this information as explained above. The timer offset value in this periodic advertisement reflects the time from periodic advertisement 303 to the start of periodic advertisement 313. Thus, the information in this periodic advertisement 303 allows the wireless device 120*b* to wake up to receive the periodic advertisement 313 on the second PAwR train 310.

Finally, at some later time, the periodic advertiser 110 stops transmitting the first PAwR train 300, as shown in Box 470. This may be done immediately after sending the new parameters once for each subevent, or may be after the new parameters are transmitted a plurality of times for each subevent.

Note that because the second PAwR train 310 has been previously established, the timer offset value transmitted by the periodic advertiser 110 may change for each periodic advertisement that is transmitted. For example, in the periodic advertisement 301, the timer offset value may represent the time between that periodic advertisement and periodic advertisement 312 in the second PAwR train 310. Further, in the periodic advertisement 303, the timer offset value may represent the time between that periodic advertisement and periodic advertisement 313 in the second PAwR train 310. In other words, it is not a requirement of this approach that all wireless devices 120*a*-120*e* transition to the second PAwR train 310 at the same time.

Figure 5:
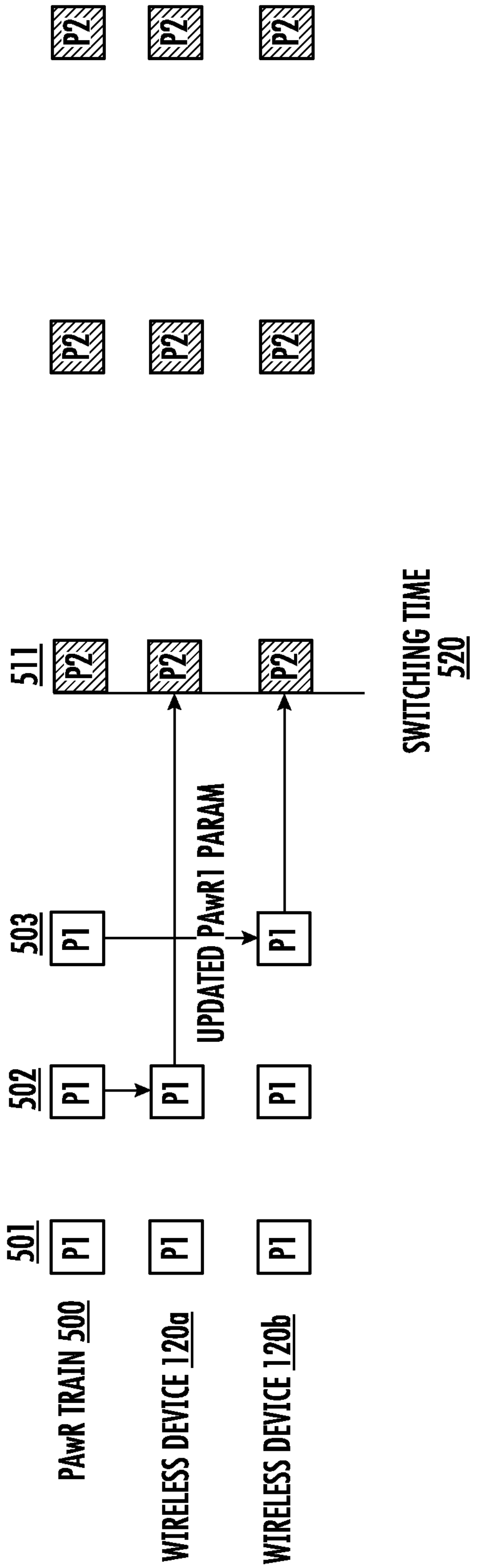
FIG. 5 shows a timing diagram showing the transition from one set of PAwR train parameters to a revised PAwR train according to one embodiment.
Figure 6:
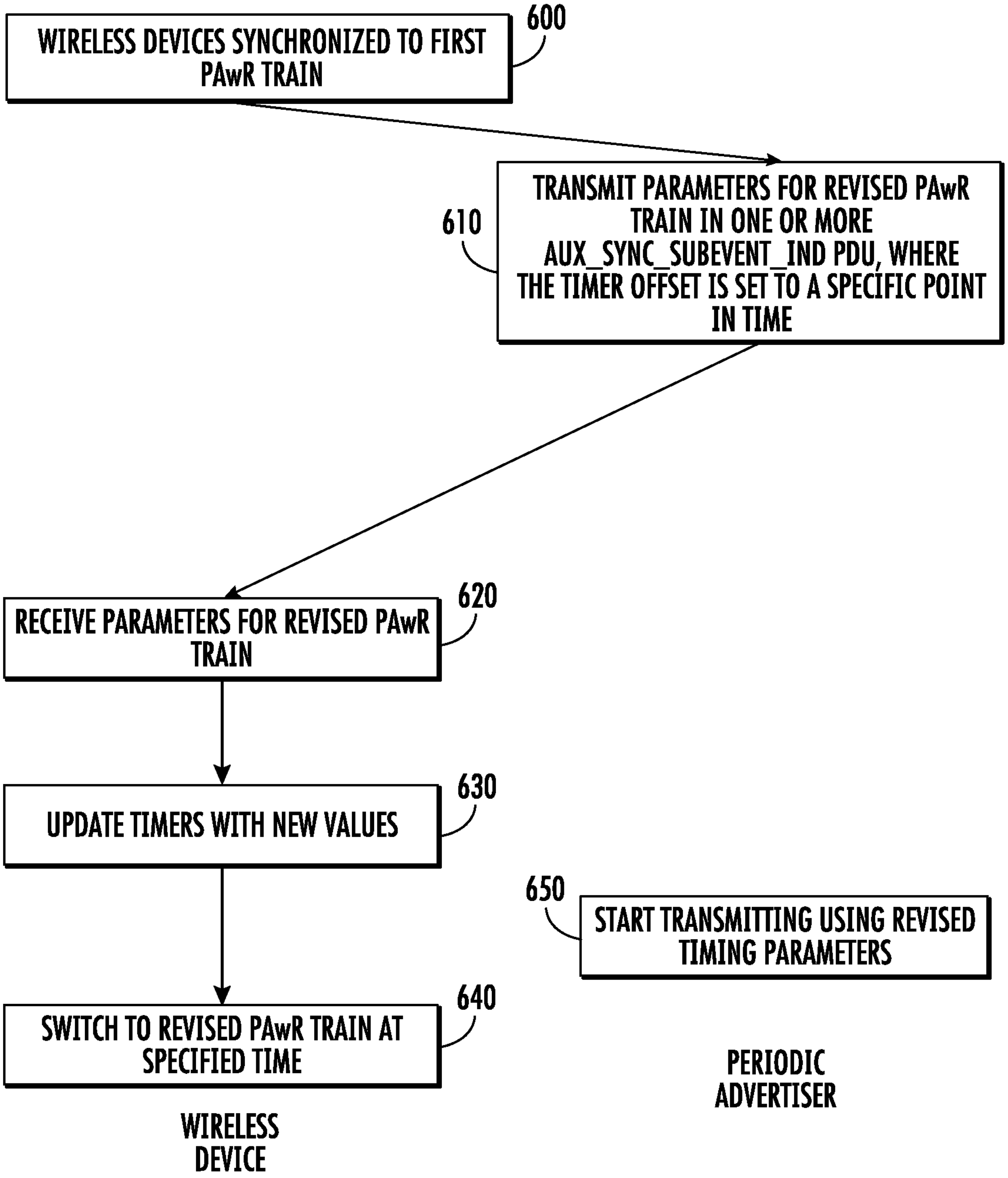
FIG. 6 is a flowchart showing the operation of the advertiser and wireless devices using the method of FIG. 5.

FIG. 5 shows a second embodiment, while FIG. 6 is a flowchart detailing this operation. In this embodiment, the periodic advertiser 110 does not create a second PAwR train. Rather, the periodic advertiser 110 simply changes the timing parameters associated with the PAwR train 500. Thus, in this embodiment, there is a fixed point in time when the wireless devices 120*a*-120*e* all switch to the new timing parameters.

As was described earlier, initially, all wireless devices 120*a*-120*e* are synchronized to the PAwR train 500, as shown in Box 600. The periodic advertisements that are part of the initial PAwR train are labelled P1. The periodic advertiser 110 then transmits periodic advertisements 501, 502, 503, each of which include the timing parameters associated with the revised PAwR train, as shown in Box 610. In FIG. 5, the revised PAwR train is shown in cross-hatched boxes labelled P2. Further, in each periodic advertisement, the timer offset value is set so as to denote a specific time in the future, such as switching time 520. Thus, the value of the timer offset value decreases with each successive periodic advertisement 501, 502, 503 as these draw closer to switching time 520.

The wireless devices 120*a*-120*e* receive one or more of these periodic advertisements 501, 502, 503, as shown in Box 620. In FIG. 5, wireless device 120*a* received periodic advertisement 502, so it updates its timer to wake at the switching time 520, as shown in Box 630. Consequently, wireless device 102*a* does not receive periodic advertisement 503. In contrast, wireless device 120*b* did not receive periodic advertisement 502, so it continues operating using the original PAwR train parameters. It then receives periodic advertisement 503, so it updates its timer to wake at the switching time 520. The periodic advertiser 110 then sends the periodic advertisement 511 using the new PAwR timing parameters as shown in Box 650. As shown in Box 640, both devices receive the periodic advertisement 511, which arrives at the specified switching time 520 and is the first periodic advertisement that uses the revised PAwR timing parameters.

Note that while the disclosure describes mechanisms to modify parameters for PAwR trains, these techniques are also applicable to traditional Periodic Advertisements. This embodiment uses the techniques described above, wherein the new train parameters may be sent in either in AUX_SYNC_IND or AUX_SYNC_SUBFRAME_IND PDU headers. Additionally, Periodic Advertisements also includes fewer parameters, such that only the periodic advertising interval and the timer offset values need to be communicated to the listening devices. As described above, the periodic advertiser may create a second PA train and switch the plurality of listening devices to the second PA train (as shown in FIGS. 3-4), or may set a fixed time to transition the PA train to the modified parameters (as shown in FIGS. 5-6).

The present system and method have many advantages.

As an example, a supermarket may utilize electronic shelf labels (ESL). During the operating hours of the supermarket, it may be desirable to update the ESLs quickly, to reflect price changes or changes in inventory. This requires a first value of the Periodic Advertising Interval. However, when the supermarket is closed, there is no need to update the labels as frequently. In fact, to conserve power, it would be advantageous if the periodic advertisements were less frequent, allowing the ESLs to remain in low power mode for longer durations. Currently, this is done by having the periodic advertiser 110 simply change its PAwR timing parameters. All of the ESLs will lose synchronization with the advertiser. Consequently, all of the labels will have to stay powered up looking for a new periodic advertisement. Once that new periodic advertisement is received, the labels can update their parameters and synchronize to the updated PAwR train. However, this process is energy inefficient, as all of the labels must remain operational until they detect a new periodic advertisement. Using the methods described herein, the labels are able to seamlessly switch to the revised PAwR train without losing synchronization and having to remain in high power mode for extended periods of time.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of modifying parameters associated with an initial Periodic Advertisement with Responses (PAwR) train, the method comprising:

starting, by a periodic advertiser, a modified PAwR train;

transmitting parameters associated with the modified PAwR train from the periodic advertiser to a plurality of wireless devices within an Auxiliary Synchronization Subevent Indication Protocol Data Unit (AUX_SYNC-_SUBEVENT_IND PDU), wherein the plurality of wireless devices are synchronized to the initial PAwR train;

wherein the modified PAwR train is started prior to transmitting the parameters, such that the periodic advertiser is transmitting both the initial PAwR train and the modified PAwR train; and wherein one of the parameters comprises a timer offset value, which defines a time from a current time to a start of a periodic advertisement on the modified PAwR train.

2. The method of claim 1, wherein the plurality of wireless devices receive the AUX_SYNC_SUBEVENT_IND PDU, adjust internal timers based on the timer offset value so as to exit low power mode in time to receive the periodic advertisement on the modified PAWR train.

3. The method of claim 1, wherein the parameters include at least one of:

a periodic advertising interval;

a subevent advertising interval;

a number of subevents;

a duration of a subevent; or a duration of a response slot.

4. The method of claim 1, wherein the periodic advertiser terminates the initial PAWR train after transmitting the parameters.

5. The method of claim 1, wherein the periodic advertiser transmits the parameters during a plurality of AUX_SYNC_SUBEVENT_IND PDUs before terminating the initial PAwR train.

6. The method of claim 5, wherein the timer offset value represents a time from the current time to a next periodic advertisement on the modified PAWR train.

7. The method of claim 1, wherein a periodic advertising interval of the modified PAwR train is different from a periodic advertising interval of the initial PAWR train.

8. A Bluetooth network, comprising:

a periodic advertiser; and a plurality of wireless devices;

wherein the plurality of wireless devices are synchronized to the initial PAwR train transmitted by the periodic advertiser;

wherein the period advertiser starts a modified PAwR train;

wherein the periodic advertiser transmits parameters associated with the modified PAwR train from the periodic advertiser to the plurality of wireless devices within an Auxiliary Synchronization Subevent Indication Protocol Data Unit (AUX_SYNC_SUBEVENT_IND PDU), such that the periodic advertiser is transmitting both the modified PAwR train and the initial PAwR train before transmitting the parameters; and wherein one of the parameters comprises a timer offset value, which defines a time from a current time to a start of a periodic advertisement on the modified PAwR train; and wherein the plurality of wireless devices receive the AUX_SYNC_SUBEVENT_IND PDU, adjust internal timers based on the timer offset value so as to exit low power mode in time to receive the periodic advertisement on the modified PAwR train.

9. The Bluetooth network of claim 8, wherein the periodic advertiser terminates the initial PAwR train after transmitting the parameters.

10. The Bluetooth network of claim 8, wherein the periodic advertiser transmits the parameters during a plurality of AUX_SYNC_SUBEVENT_IND PDUS before terminating the initial PAWR train.

11. The Bluetooth network of claim 10, wherein the timer offset value represents a time from the current time to a next periodic advertisement on the modified PAWR train.

12. The Bluetooth network of claim 8, wherein a periodic advertising interval of the modified PAwR train is different from a periodic advertising interval of the initial PAwR train.

13. A method of modifying parameters associated with an initial Periodic Advertisement (PA) train, the method comprising:

starting, by a periodic advertiser, a modified PA train;

transmitting parameters associated with the modified PA train from the periodic advertiser to a plurality of wireless devices within an Auxiliary Synchronization Indication (AUX_SYNC_IND) or an Auxiliary Synchronization Subframe Indication Protocol Data Unit (AUX_SYNC_SUBFRAME_IND PDU), wherein the plurality of wireless devices are synchronized to the initial PA train;

wherein the modified PA train is started prior to transmitting the parameters, such that the periodic advertiser is transmitting both the initial PA train and the modified PA train; and wherein one of the parameters comprises a timer offset value, which defines a time from a current time to a start of a periodic advertisement on the modified PA train.

14. The method of claim 13, wherein the plurality of wireless devices receive the AUX_SYNC_IND or AUX_SYNC_SUBFRAME_IND PDU, adjust internal timers based on the timer offset value so as to exit low power mode in time to receive the periodic advertisement on the modified PA train.

15. The method of claim 13, wherein the periodic advertiser terminates the initial PA train after transmitting the parameters.

16. The method of claim 13, wherein the periodic advertiser transmits the parameters during a plurality of AUX_SYNC_IND or AUX_SYNC_SUBFRAME_IND PDUs before terminating the initial PA train.

17. The method of claim 16, wherein the timer offset value represents a time from the current time to a next periodic advertisement on the modified PA train.

18. The method of claim 13, wherein a periodic advertising interval of the modified PA train is different from a periodic advertising interval of the initial PA train.

* * * * *